United States Patent
Tolhuizen et al.

(10) Patent No.: US 10,180,824 B2
(45) Date of Patent: Jan. 15, 2019

(54) COMPUTING DEVICE COMPRISING A TABLE NETWORK

(71) Applicant: KONINKLIJKE PHILIPS N.V., Eindhoven (NL)

(72) Inventors: Ludovicus Marinus Gerardus Maria Tolhuizen, Waalre (NL); Paulus Mathias Hubertus Mechtildis Antonius Gorissen, Eindhoven (NL); Mina Deng, Shanghai (CN); Alphons Antonius Maria Lambertus Bruekers, Nederweert (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 334 days.

(21) Appl. No.: 14/443,409

(22) PCT Filed: Dec. 17, 2013

(86) PCT No.: PCT/EP2013/076782
§ 371 (c)(1),
(2) Date: May 18, 2015

(87) PCT Pub. No.: WO2014/095772
PCT Pub. Date: Jun. 26, 2014

(65) Prior Publication Data
US 2017/0235552 A1    Aug. 17, 2017

Related U.S. Application Data

(60) Provisional application No. 61/740,691, filed on Dec. 21, 2012.

(30) Foreign Application Priority Data

Dec. 27, 2012 (EP) .................................... 12199387

(51) Int. Cl.
G06F 9/45 (2006.01)
G06F 8/41 (2018.01)
(Continued)

(52) U.S. Cl.
CPC ................ *G06F 8/41* (2013.01); *H04L 9/002* (2013.01); *H04L 9/0618* (2013.01); *H04L 63/0428* (2013.01); *H04L 2209/16* (2013.01)

(58) Field of Classification Search
None
See application file for complete search history.

(56) References Cited

U.S. PATENT DOCUMENTS

| 5,111,390 A | 5/1992 | Ketcham |
| 2008/0144645 A1* | 6/2008 | Russell .................. H04L 47/10 370/412 |

(Continued)

FOREIGN PATENT DOCUMENTS

| EP | 0905616 A2 | 3/1999 |
| EP | 2482184 A1 | 8/2012 |

(Continued)

OTHER PUBLICATIONS

S. Chari, "Towards Sound Approaches to Counteract Power-Analysis Attacks", Crypto 99, Springer Lecture Notes in Computer Science, vol. 1666, pp. 398-412, 1999.

(Continued)

*Primary Examiner* — Lynn D Feild
*Assistant Examiner* — Richard A McCoy

(57) ABSTRACT

A computing device is provided configured to compute a data function on a function-input value comprising an electronic storage storing a table network configured for the data function and an electronic processor coupled to the storage and configured to compute the data function by applying the table network, wherein the device is configured to obtain the (Continued)

function-input value as an encoded input value, the encoded input value combines the function-input value together with a state-input value encrypted together into a single value, the table network is configured to take as input the encoded input value and produce as output an encoded output value, the encoded output value combines a function-output value together with a state-output value encrypted data function together into a single value, wherein the function-output value equals the result of applying the data function to the function-input value, and the state-output value equals the result of applying a state function to the state-input value.

16 Claims, 9 Drawing Sheets

(51) Int. Cl.
*H04L 9/00* (2006.01)
*H04L 9/06* (2006.01)
*H04L 29/06* (2006.01)

(56) References Cited

U.S. PATENT DOCUMENTS

| | | | |
|---|---|---|---|
| 2009/0199069 A1* | 8/2009 | Palanki | H04L 1/0065 714/755 |
| 2009/0228717 A1 | 9/2009 | Futa et al. | |
| 2009/0254759 A1* | 10/2009 | Michiels | H04L 9/002 713/189 |
| 2012/0155638 A1 | 6/2012 | Farrugia et al. | |
| 2012/0300922 A1 | 11/2012 | Billet et al. | |
| 2014/0101458 A1* | 4/2014 | Farrugia | G06F 21/125 713/190 |

FOREIGN PATENT DOCUMENTS

| | | |
|---|---|---|
| JP | 2009529819 A | 8/2009 |
| JP | 2011514091 A | 4/2011 |
| JP | 2012520589 A | 9/2012 |
| JP | 2012530269 A | 11/2012 |
| RU | 2009120207 A | 12/2010 |
| WO | 2007105126 A2 | 9/2007 |
| WO | 2007130266 A1 | 11/2007 |
| WO | 2009109884 A1 | 9/2009 |
| WO | 2010102960 A1 | 9/2010 |
| WO | 2010146139 A1 | 12/2010 |
| WO | 2013104969 A1 | 7/2013 |
| WO | 2014095772 A1 | 6/2014 |
| WO | 2015091583 A1 | 6/2015 |

OTHER PUBLICATIONS

Chow et al: "White-Box Cryptography and an AEA Implementation"; 2002, Retrieved From the Internet: http://citeseer.ist.psu.edu/732354.htm, 18 Page Document.

Malagon et al: "Compiler Optimizations as a Countermeasure Against Side-Channel Analysis in MSP430-Based Devices"; Sensors, vol. 12, No. 12, 2012, pp. 7994-8012.

* cited by examiner ered input value, the table network is configured to take as input the encoded input value and produce as output an encoded output value, the encoded function-output value, the function-output value equals the result of applying the data function to the function-input value.

COMPUTING DEVICE COMPRISING A TABLE NETWORK

CROSS-REFERENCE TO PRIOR APPLICATIONS

This application is the U.S. National Phase application under 35 U.S.C. § 371 of International Application No. PCT/IB2013/076782, filed on Dec. 17, 2013, which claims the benefit of U.S. Provisional Patent Application No. 61/740,691, filed on Dec. 21, 2012 and European Patent Application No. 12199387.7, filed on Dec. 27, 2012. These applications are hereby incorporated by reference herein.

FIELD OF THE INVENTION

The invention relates to a computing device configured to compute a data function on a function-input value, the device comprising an electronic storage storing a table network configured for the data function and an electronic processor coupled to the storage and configured to compute the data function by applying the table network, wherein the device is configured to obtain the function-input value as an encoded input value, the table network is configured to take as input the encoded input value and produce as output an encoded output value, the encoded function-output value, the function-output value equals the result of applying the data function to the function-input value.

The invention further relates to a corresponding method and compiler.

BACKGROUND OF THE INVENTION

US 2012/0300922 discloses a method for generating a correspondence table suitable for use in a cryptographic processing method and comprising storing a plurality of input data and of output data in the table, each input datum being associated with at least one output datum in the table. For each input datum, at least one of the output data is obtained by applying a coding function to a first subsidiary datum and to an encrypted intermediate datum depending on the input datum.

US 2012/0155638 discloses that in the field of computer enabled cryptography, such as a block cipher, the cipher is hardened against an attack by protecting the cipher key, by applying to it a predetermined linear permutation before using one key to encrypt or decrypt a message. This is especially advantageous in a "White Box" environment where an attacker has full access to the cipher algorithm, including the algorithm's internal state during its execution. This method and the associated computing apparatus are useful where the key is derived through a process and so is unknown when the software code embodying the cipher is compiled. This is typically the case where there are many users of the cipher and each has his own key, or where each user session has its own key.

In traditional cryptography it was typically assumed that an attacker only gains access to the input and output values of a secure system. For example, the attacker would be able to observe a plain text going into a system and observe an encrypted text going out of the system. Although an attacker could try to gain an advantage by analyzing such input/output pairs, possibly even using computationally intense methods, he was not thought to have direct access to the system that implemented the input/output behavior.

Recently, it has become necessary to take threat models into account in which it is assumed that an attacker has some knowledge of the implementations. For example, one may consider the threat of side-channel analysis and of reverse engineering. Furthermore, the concerns that previously were mostly associated with security problems have extended to other fields, such as privacy. Although cryptographic systems processing security information such as cryptographic keys remain a prime concern, protection of other programs, e.g., those processing privacy relevant information has also become important.

It has long been known that computer systems leak some information through so-called side-channels. Observing the input-output behavior of a computer system may not provide any useful information on sensitive information, such as secret keys used by the computer system. But a computer system has other channels that may be observed, e.g., its power consumption or electromagnetic radiation; these channels are referred to as side-channels. For example, small variations in the power consumed by different instructions and variations in power consumed while executing instructions may be measured. The measured variation may be correlated to sensitive information, such as cryptographic keys. This additional information on secret information, beyond the observable and intended input-output behavior is termed a side-channel. Through a side-channel a computer system may 'leak' secret information during its use. Observing and analyzing a side-channel may give an attacker access to better information than may be obtained from cryptanalysis of input-output behavior only. One known type of side-channel attack is the so-called differential power analysis (DPA).

Current approaches to the side-channel problem introduce randomness in the computation. For example, in between real operations that execute the program dummy instructions may be inserted to blur the relationship between power consumption and the data the program is working on.

An even stronger attack on a computer is so called reverse engineering. In many security scenarios attackers may have full access to the computer. This gives them the opportunity to disassemble the program and obtain any information about the computer and program. Given enough effort any key hidden say in a program may be found by an attacker.

Protecting against this attack scenario has proven very difficult. One type of counter measure is so-called white-box cryptography. In white-box cryptography, the key and algorithm are combined. The resulting algorithm only works for one particular key. Next the algorithm may be implemented as a so-called, lookup table network. Computations are transformed into a series of lookups in key-dependent tables. See for example, "White-Box Cryptography and an AES Implementation", by S. Chow, P. Eisen, H. Johnson, P. C. van Oorschot, for an example of this approach.

SUMMARY OF THE INVENTION

The known countermeasures against computer systems are not entirely satisfactory. For example, the introduction of randomness may countered by statistical analysis. The obfuscation of software may be countered by more advanced analysis of the operation of the program. There is thus a need for more and better countermeasures.

For example, one way to obfuscate a computer program is to encode the input values and to operate as much as possible on encoded values. One may even use so-called table networks to perform computations. Such table network may be crafted by hand, or by specialized programs, e.g. in the case of white-box cryptography, or by general purpose compilers. It was believed that, generally speaking, a table obfuscates the type of operation that is performed. However, the inventors have found that the latter is generally not true. Even if the input(s) and output (s) of a function are encoded, statistical properties of the input/output relations may reveal which function is being encoded. An example of this phenomenon follows.

Consider W={0, 1, . . . , N−1}, an encoding E, and its corresponding decoding D=E$^{-1}$. Let F and G denote encoded modulo N addition and encoded modulo N multiplication, respectively. That is, define F: W×W→W as F(x,y)=E(D(x) $\oplus_N$D(y)), where $\oplus_N$ denotes modulo N addition, and G: W×W→W as G(x,y)=E(D(x)$*_N$D (y)), where $*_N$ denotes modulo N multiplication.

For each fixed x, we have that {F(x,y)|y∈W}=W. Also, for each non-zero x∈W, and N prime, we have that {G(x, y)|y∈W}=W, and {G(0,y)|y∈W}=E(0). For N non-prime similar patterns occur.

As a consequence, independent of the encoding E, one can determine that F cannot be an encoded modulo N multiplication, and that G cannot be an encoded modulo N addition. An attacker has at least two methods to do so. He could fix two different elements $x_1$ and $x_2$ in W and for H∈{F, G}, compare H($x_1$,y) and H ($x_2$,y) for all y. If these quantities are equal for all y, then H cannot represent modulo N multiplication; if these quantities agree for all y, then H cannot represent modulo N addition. An attacker who cannot choose which table entries to read, but can observe the results of table accesses of a running software program can use the fact that each element of W occurs equally often as output of while with G, the element E(0) occurs as an output much more frequently. So if an element of W occurs much more often than other elements of W as output of H, then H is more likely to be an obfuscated modulo N multiplication than an obfuscated modulo N addition.

In other words, if one uses one of the best software obfuscations methods available, i.e., if one that uses full encoding of the input and output values and table-networks for the computations, then still some information may be obtained by inspection of the program. This situation is highly undesirable.

It would be advantageous to have device or method that address some of the issues discuses above. The invention is defined by the independent claims. The dependent claims define advantageous embodiments.

A first aspect of the invention concerns a compiler configured for compiling a computer program, the compiler being configured for parsing the computer program to identify multiple operators, including a data function (f) and a state function (g), and for producing a table network configured for the data function and the state function, wherein the table network is configured to take as input an encoded input value and produce as output an encoded output value, the encoded output value combines a function-output value together with a state-output value encrypted together into a single value, wherein the function-output value equals the result of applying the data function to the function-input value, and the state-output value equals the result of applying the state function to the state-input value, wherein the encoded input value combines the function-input value together with a state-input value encrypted together into a single value.

Also, a computing device is provided configured to compute run a computer program compiled by such a compiler. The computing device comprises an electronic storage storing a table network configured for the data function and an electronic processor coupled to the storage and configured to compute the data function by applying the table network.

The device is configured to obtain the function-input value as an encoded input value, the encoded input value combines the function-input value together with a state-input value encrypted together into a single value. The table network is further configured to take as input the encoded input value and produce as output an encoded output value, the encoded output value combines a function-output value together with a state-output value encrypted together into a single value, wherein the function-output value equals the result of applying the data function to the function-input value, and, the state-output value equals the result of applying a state function to the state-input value.

Obtain a function-input value as an encoded input value means that the device receives the function-input because it receives the encoded input value in which it is encoded together with another value.

The device computes two functions: a data function that takes as input a function-input value and produces a function-output value, and a state function that takes as input a state-input value and produces a state-output value. However, although two, possibly different, functions are computed on independent input values, producing respective independent output values, only one table-network is needed. The one table network receives a single encoded input value into which both the function input value and state input value are encrypted. The state-input value can attain at least two different values.

Implementing two functions in a single table network, in which the function input values are encoded together with one of multiple state values has the advantage that a function input values corresponds to multiple different encoded input values. This means that attacks which are based on listing the correspondence between input values and intermediate values are thwarted. In addition it is an advantage that the data function and state function are independent, i.e., the state function does not depend on any one of the (possibly multiple) function inputs and the data function does not depend on any one of the (possibly multiple) state inputs. This means that the same table network may be used for different functions at different times; to different functions at the same time; or to one but not the other. Furthermore these three options may be used in the same program for different table networks. This adds considerably to the difficulty of reverse engineering. Indeed, even from an information theoretic viewpoint, having a table network which encodes two different functions makes it impossible to judge from the network itself for which function it is used, since network is actually configured for two, anyone of which could be or could not be used. Thus the attacker is forced to analyze much larger portions of the program at the same time.

An encryption (often referred to as 'E') is reversible, that is from an encoded pair of a function input value and a state input value, both the function input value and the state input value may be recovered. Likewise, from an encoded pair of function output value and state output value, both the function output value and the state output value may be recovered.

An encryption is private, that is, different implementations of the system may use a different way to encrypt input or output values together. Furthermore, the encryption adheres at least in part to the principle of diffusion. The values in the encoded value depend on a large part of the encoded value. For example, when an input/output value is recovered from an encoded input/output value, then the input/output value depends preferably on all of the encoded input/output value; at least it depends on more bits than the bit size of the input/output value itself. This has the effect that the information on the input/output value is distributed over many bits. Preferably, if one has access to only part of an encoded value, it is impossible to recover the values it encodes, even if one had perfect knowledge of the encoding/decoding function. Note that traditionally, encryption frequently makes use of a key. Using a keyed encoding is an attractive possibility, but due the relatively small size of the input/output values it is also possible to represent the encoding as a table. For this reason encoding and encrypting in the context of variable values, such as input/output values or intermediates values are used interchangeably.

Because the table network may represent two functions, and indeed the encoded input values contains two inputs (the function and state), it is impossible to tell from the table network if it is an encoded version of the data function or of the state function. Indeed the table network is fully equipped to compute either function and indeed does compute both functions on an independent variable, or set of variables (in embodiments of data functions and-or state functions having multiple inputs).

For example, applied to the example above, one would obtain a table network which could be used to perform addition and multiplication. By inspection of the table network one cannot tell which one is used, since in fact the table network can perform either one.

The data function may take one or multiple input values. The state function may take one or multiple input values. In an embodiment, the number of input values of the data and state function is the same. For example, the device may be configured to obtain the multiple function-input values as multiple encoded input values. Each one of multiple encoded input values combines a function-input value of the multiple input values together with a state-input value of the multiple state input values encrypted together into a single value. The table network is configured to take as input the multiple encoded input values and produce as output an encoded output value. The encoded output value combines a function-output value together with a state-output value encrypted together into a single value. The function-output value equals the result of applying the data function to the multiple function-input values, and the state-output value equals the result of applying a state function to the multiple state-input values.

Several different ways to produce such table networks will be shown below. Any intermediate value that equals or depends on the function input value, including the function output value only occurs in an encoded form, i.e., encrypted together with a state variable. Ideally, this property also holds for the state input variable, although it may be needed to make concessions at this point in order to satisfy competing demands on the available resources. For example, one way to have this property is to create a table network comprising a single table taking as input the encoded input value and producing as output the encoded output value.

It possible to split off the state computation to a certain extent, for example the table network may comprise a state extractor table and a state function table. The state extractor table is configured such that the state extractor table applied to the encoded input value produces the state-input value. The state function table is configured such that the state function table applied to state-input value produces the state-output value. Note that even if the state value is obtained in the table network, the function input value remains encoded. Also note that state extractor tables may produce the state value in an encoded form, although an encoded form which does not depend on the input value, e.g., an encoded state value obtainable by encrypting the state value only.

Once the state-output value is available, possibly in encoded form, one may use a re-encoding table. A re-encoding table takes as input an encoded value and produces an encoded value, however the encoding has changed. For example, the re-encoding table may be configured to receiving as input the encoded input value and the state-output value and producing as output a recoded input value. The recoded input value combines the function-input value together with the state-output value encrypted together into a single value. A data function table may be applied to the recoded input value to obtain the encoded output value. For example, the data function table may be configured for receiving as input the recoded input value and as output the encoded output value.

This reduces the size of the needed tables. Yet it remains the case that the table network computes two functions: the data function and the state function. An attacker cannot know for which function the table network is used. Furthermore, even though the state value occurs in a form which is not encoded together with the input value, the input value only occurs in encoded form.

It is possible to reduce the size of the tables even further. For example, the table network may comprise a reduced state function table and a first re-encoding table. The reduced state function table is configured for receiving the state-input value and for producing as output an intermediate state value equal to the result of a reduced state function applied to state-input value, the range of the reduced state function being larger than a single value and smaller than the range of the state function. The first re-encoding table configured for receiving as input the encoded input value and the intermediate state value and producing as output a recoded input value, the recoded input value combines the function-input value together with the intermediate state value encrypted together into a single value.

The table network thus computes three functions, the state function, the reduced state function and the data function. Because the reduced state function has a range smaller than the state function, the table for the data function is reduced. Note that the range of the reduced state function has a size larger than 1, so that each input data value has more than one representative even with the reduced state space. In an embodiment, the size, i.e., number of values, of the reduced state space, is at least 2, 4 or 8.

For example, the table network may comprise a data function table and a second re-encoding table. The data function table is configured for receiving as input the recoded input value and as output a recoded output value, the recoded output value combines the function-output value together with the intermediate state value encrypted together into a single value. The second re-encoding table is configured for receiving as input the recoded output value and the state-output value and producing as output the encoded output value.

In an embodiment, the table network is configured for data-input values having at least 4, preferably at least 8 bits. In an embodiment, the table network is configured for state-input values having at least 4, preferably at least 8 bits.

In an embodiment, the data-input values and state input values have the same bit size. If the data function and the state function have equal input size they are indistinguishable on this front. In an embodiment, the data-output values and state output values have the same bit size.

In an embodiment, the data-input values and state value have the same bit size and have 4 bits or more. In an embodiment, the data-input values and state value have the same bit size and have 6 bits or more. In an embodiment, the data-input values and state value have the same bit size and have 8 bits or more.

An aspect of the invention concerns a method for run a computer program compiled by a compiler according to the first aspect of the invention, the method comprising computing the data function by applying a table network to an encoded input value and producing as output an encoded output value, the encoded input value combines the function-input value together with a state-input value encrypted together into a single value, the encoded output value combines a function-output value together with a state-output value encrypted together into a single value, wherein the function-output value equals the result of applying the data function to the function-input value, and the state-output value equals the result of applying a state function to the state-input value.

The computing device is an electronic device, e.g., a mobile electronic device, mobile phone, set-top box, computer, or the like.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings.

Figure 1:
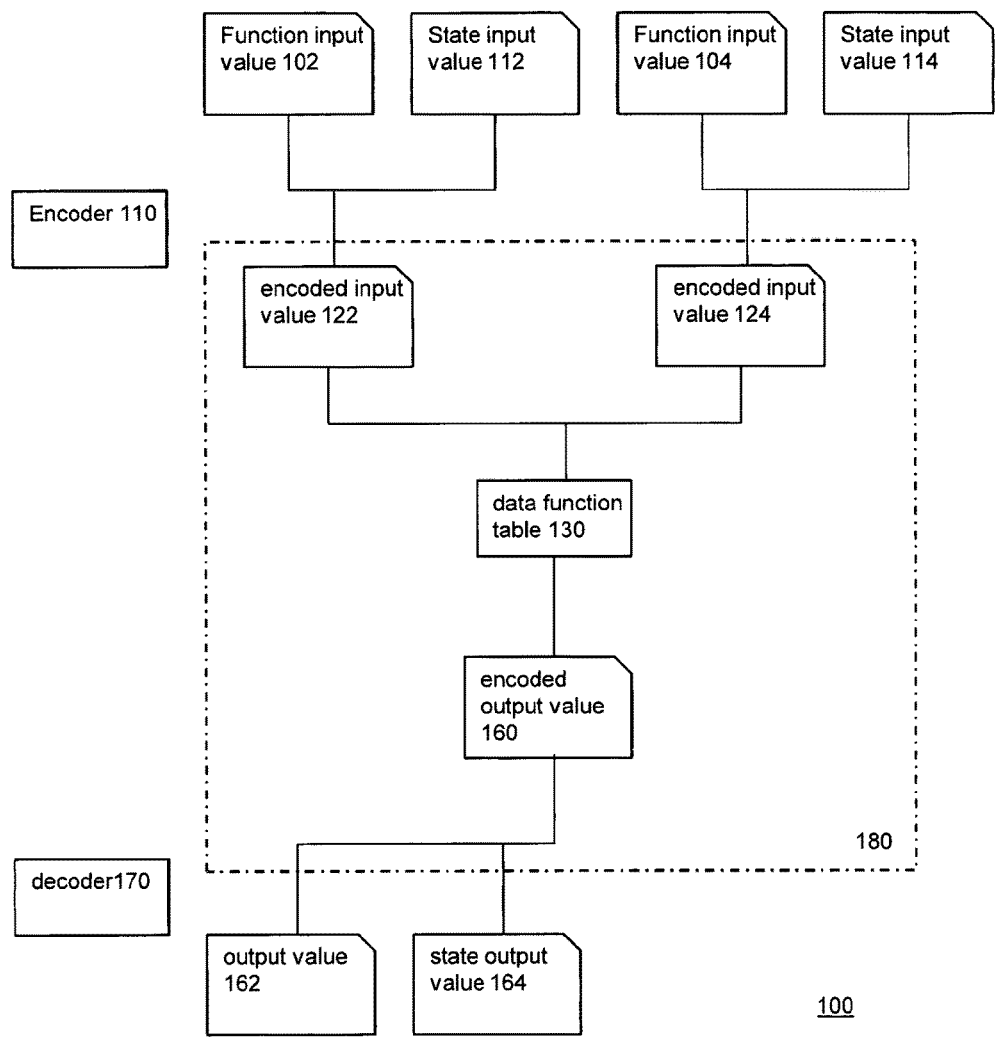
FIG. 1 is schematic chart illustrating a table network implementing a data function and a state function.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

In the figures, tables are illustrated with rectangles, and values are illustrated with a rectangle with the upper right corner cut-off.

Figure 4:
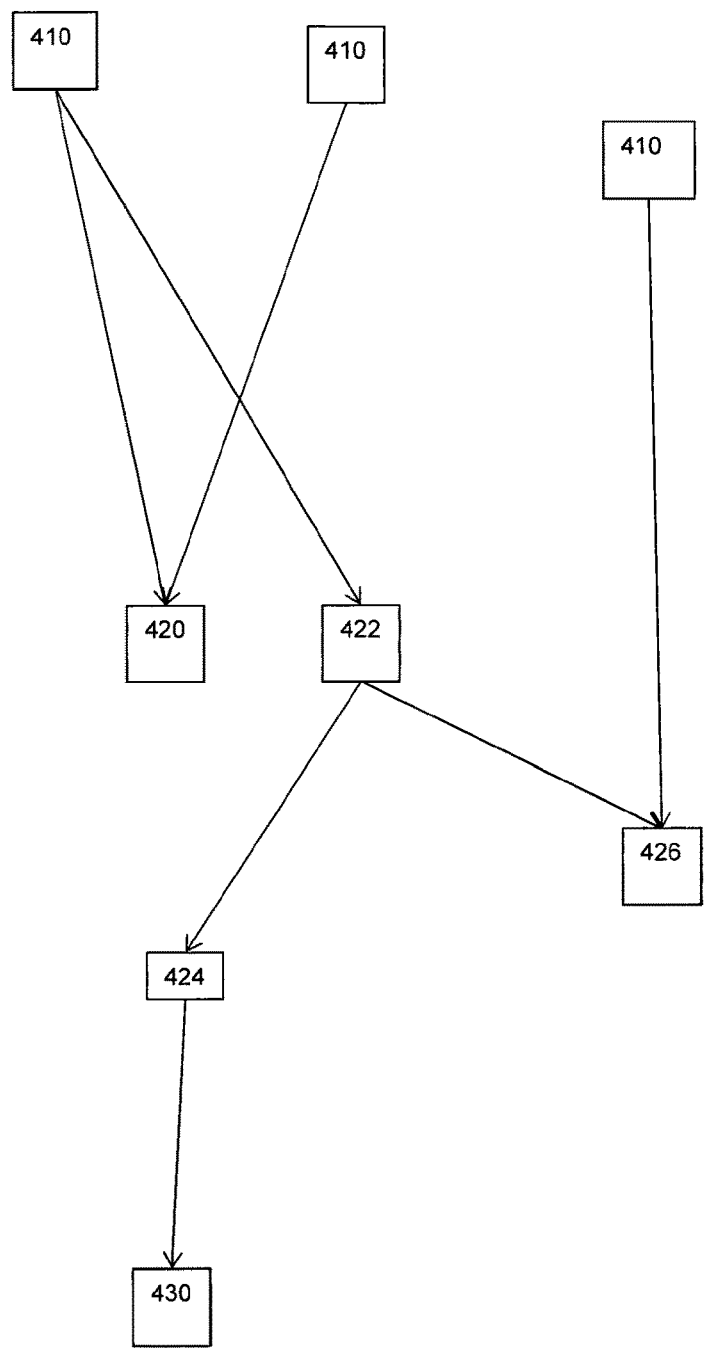
FIG. 4 is a block diagram illustrating table networks in general.

FIG. 4 illustrates the general concept of table network, shown is table network 400. Most functions may be expressed as a network of tables. In particular any composition of arithmetic and logic operations may be so expressed. For example, the network of tables, may be an implementation, e.g. of a cipher. Shown are 8 tables of multiple tables. A table transforms an input value to an output value by table-lookup of the input value. Shown are three of the input tables 410, for receiving input from outside the function implementation. Shown is one of the output tables 430. The output tables 430 together form the output of the function implementation, e.g. by concatenation. Shown are four tables of the intermediate tables 420, 422, 424, 426, who receive at least one input from another one of the tables, and who produce an output for use as an input for at least one other table. The tables together form a network. The cipher may be a block cipher; the block cipher may be configured for encryption or for decryption. The block cipher encrypts a block cipher, say AES. The implementation may be for a particular key, in which case the tables may depend on the particular key.

Look-up table 426 represents an operator having two inputs and one output. The construction of look-up tables for monadic operators may be extended to dyadic operators. For example, the second input may be 'curried out'; referring to the function transformation technique, currying is the technique of transforming a function that takes n multiple arguments (or an n-tuple of arguments) in such a way that it can be called as a chain of functions, each with a single argument. When this approach is used the look-up table 426 is implemented as multiple monadic look-up tables. On the other hand one may also generate bit strings for each input and concatenate the results. In this way the look-up table is generated directly, and one single but larger look-up table is obtained. Although, the layout of the look-up tables may differ based on the construction, they have equal size and the same properties. Note that it is not necessary that the multiple input values are encoded according to the same encoding.

The table network may use multiple tables encoding two functions or have as sub network table networks that encode for two functions. The system may be configured to use that state or data function of a network table depending on the current encoding. Table network obfuscation techniques may be applied, also in table networks as described herein.

For example, suppose a second table receives as input the output of a first table, then the output of a first table may be encoded with a secret, e.g. randomly chosen, encoding, and the input of a second table may be encoded with the inverse encoding.

FIG. 1 shows a table network 180 embedded in a larger table network 100. Table network 180 contains only a single table 130.

Table network 180 is configured to take multiple encoded input values as input, shown are encoded input values 122 and 124. Table network 180 is configured to produce as output an encoded output value 160. In the description below we will assume data functions and state functions having two input values and a single output value. However, the embodiments may be extended to any number of input values and/or output values. In particular data/state functions with one input and one output are possible and data/ state functions with two inputs and one output are possible.

Table network 180 is configured for the data function and is stored in an electronic storage, coupled to an electronic processor configured to compute the data function by applying the table network.

The encoded value 122 is obtained from a function input value 102 and a state input value 112. For example, this may be done by an encoder 110. Encoder 110 may be included in the same device which stores table network 180, but this is not needed. Input values may be received already in encoded form and/or be transmitted in encoded form. Or they may be received/transmitted in un-encoded form. In the latter case they may be encoded and used internally in encoded form. There may also be a re-encoding, e.g., if outside of the device a different encoding is used. For example, function output value 162 and state output value 164 may be obtained from a decoder 170.

Encoded input of the data function may be the output of another table or table network. The latter may or may not be a table network configured for two functions. By combining table networks configured for different data functions, entire programs may be built up.

Encoder/decoder 110 and 170 may be obtained as each other's inverse. Encoder 110 may be obtained as follows. Each possible combination of function input value and state input value is listed. For example, if both are 4 bit wide, than there are 16*16=256 possible combinations. The 256 combinations may be mapped to itself in a random bijective order. The same applies to other sizes. Also an encryption function may be used, e.g., an 8 bit block cipher may be applied, using some secret encoding key.

The encoded input value contains the function input value 102 and state input value 112 in an interdependent way, e.g., the function input depends on all bits of the encoded input. Thus, knowing only part of encoded input value 122 will generally not allow one to find either function input value 102 or state input value 112.

Below we will give a number of embodiments using mathematical language. One advantage of combining function inputs values with state values is that the function inputs have multiple representations. Function f refers to the data function and g to the state function. The function f is encoded into F such that a value in the domain of F has multiple representatives. In order to hide which function f is being encoded, input(s) and output(s) of f have multiple representations in the domain and range of the encoded version F of f. The function F is designed such that whenever X is a representative of x, then F(X) is a representative of f(x). In the sequel we sometimes speak about "long" variables (input/output of F) and "short" variables (input/output of f) to emphasize that each input/output of f corresponds to multiple input/output of F, so that we need in general more bits to represent inputs/outputs from F than to represent inputs/outputs from f. One way, to obtain multiple representations for operands is described below. Again note that for simplicity, we consider functions with equal input and output symbols; this may be generalized.

Let W denote the set of operands we wish to encode. We introduce a finite set $\Sigma$ of "states" and a finite set V with cardinality equal to the product of the cardinalities of W and $\Sigma$. The elements of $W \times \Sigma$ are mapped in a one-to-one manner to V by a secret encoding function E. The representatives of the element w in W are the members of the set $\Omega(w) = \{E(w, \sigma) | \sigma \in \Sigma\}$.

The number of representatives of each element in W thus equals the cardinality of $\Sigma$. As a result, data paths carrying symbols from V are wider than data paths for carrying symbols from W. For example, if W is the set of 16-bits integers and the state space $\Sigma$ has $16 = 2^4$ elements, data paths for V use 16+4=20 bits, while data paths for W use 16 bits.

The embodiment below encodes a function of two variables. Consider a function f: $W \times W \rightarrow W$ that we wish to encode. We construct a function F: $V \times V \rightarrow V$ such that for all $w_1, w_2 \in W$ and $\sigma_1, \sigma_2 \in \Sigma$ we have that $$F(E(w_1,\sigma_1), E(w_2,\sigma_2)) \in \Omega(f(w_1,w_2)).$$

Or, stated in words: F maps any pair of representatives of $w_1$ and $w_2$ to a representative of $f(w_1, w_2)$.

The state of the representative of $f(w_1, w_2)$ can depend on both operands $w_1$ and $w_2$ and could even depend on both states $\sigma_1$ and $\sigma_2$, in either a deterministic or in a randomized manner. More specifically, the state can depend only on the states $\sigma_1$ and $\sigma_2$, which can be implemented by taking a function g: $\Sigma \times \Sigma \rightarrow \Sigma$ and by defining $$F(E(w_2,\sigma_1), E(w_2,\sigma_2)) = E(f(w_1,w_2), g(\sigma_1,\sigma_2)).$$

An interesting special case of the embodiment above arises if we take $\Sigma = W$. Then the function F that encodes f using the function E also encodes the function g, albeit with a different encoding function $\tilde{E}$. That is, it cannot be deduced which of the two functions, for g, is being implemented by F. We define $\tilde{E}(x,y) = E(y,x)$. By computation we find that $$F(\tilde{E}(\sigma_1, w_1), \tilde{E}(\sigma_2, w_2)) = F(E(w_1, \sigma_1), E(w_2, \sigma_2)) =$$
$$E(f(w_1, w_2), g(\sigma_1, \sigma_2)) = \tilde{E}(g(\sigma_1, \sigma_2), f(w_1, w_2)).$$

A table for F thus implements the function f if the encoding E is being used, and the function g if $\tilde{E}$ is being used as encoding function. In this way, it is proven that from table 130 alone one cannot tell which function is being used, since it could encode for at least two functions.

The table for F can serve to compute both f and g. Indeed, if E is used, then, as said before, the table for F implements f. The same table can also be used for implementing g by pre- and post processing inputs and output with the function $\tilde{E}E^{-1}$. To be precise, let $w_1, w_2 \in W$, $\sigma_1, \sigma_2 \in \Sigma$, and write $v_i = E(w_i, \sigma_i)$, i=1, 2. Then we have that $$F((\tilde{E}E^{-1}(v_1), \tilde{E}E^{-1}(v_2)) = F(\tilde{E}(w_1, \sigma_1), \tilde{E}(w_2, \sigma_2)) =$$
$$F(E(\sigma_1, w_1), E(\sigma_2, w_2)) = E(f(\sigma_1, \sigma_2), g(w_1, w_2))).$$

Consequently, we have that $$\tilde{E}E^{-1}[F((\tilde{E}E^{-1}(v_1), \tilde{E}E^{-1}(v_2))] = (g(w_1,w_2), f(\sigma_1,\sigma_2)).$$

The encoded input values may be input values to a computer program, possibly containing or represented by the data function. The computer program may be running on a computer. The instructions of the computer program may be represented by the data function. The encodings and decodings may be under control of a secret key. The encoding and decoding table themselves may be regarded as such a key. If an instruction f operating on data encoded with encoding $E_k$ is applied, then it first decodes the data, then f is applied on the decoded data, and subsequently the result is encoded again. That is, the data x results in the output $F(x)=E_k(f(D_k(x)))$. By direct storage of the function F, for example as a lookup table, the function f and its semantics are hidden. In a specific embodiment, the decoding is the left inverse of encoding, that is, $D_k(E_k(x))=x$ for all x. This has the advantage if two functions f and g are encoded and decoded with the same functions $E_k$ and $D_k$, then encoded version of the function f(g(x)) can be done by using successively using the tables for $G(x)=E_k(g(D_k(x)))$ and $F(x)=E_k(f(D_k(x)))$. Indeed, it can be seen that for each x we have that $E_k(f(g(D_k(x)))=F(G(x))$, so that the encoded version for f(g(x)) can be obtained from subsequent accesses of tables for G and for F. In this way, sequences of operations can be applied without encoding and decoding between successive operations, thus greatly enhancing the security. In an embodiment of, encoding and decoding only take place at the secure side, while all encoded operations take place at an open, insecure side. The output(s) of one or more encoded functions may serve as input(s) to another encoded function. As we have seen this can be conveniently arranged if the encodings and decodings are each other's inverses. A preferred embodiment for executing a sequence of operations with our inventions is the following. First, in the secure domain, "short" variables are transformed to "long" variables. Randomisation is involved to make sure that the "long" variables occur approximately equally often. This can for example be achieved by having a device that generates a random state $\sigma \in \Sigma$, and mapping the variable x on $E_k(x,\sigma)$ where $E_k$ is an encoding of the "long" variables. After all computations at the open side, all operating using "long" variables, the decoding $D_k$ is applied at the secure side, and next, the "short" variable corresponding to the decoded long variable is determined. Alternatively, the decoding and determination of the short variable is done in one combined step. The letter k denotes a secret, e.g. a secret key.

Having multiple representatives for variables implies that data-paths become longer. Also, it implies that the table for implementing the encoded version F of f becomes larger. For example, consider a function f(x,y) which has as input two 16-bits variables x and y and as output a 16-bits variable. A table for implementing an encoded version of f, without having multiple representatives, uses a table with $2^{16}2^{16}$ entries, each table entry being 16 bits wide, which amounts to a table size of $2^{36}$ bits. Now assume that each 16-bits variable has 16 representatives; the set of representatives thus can be represented with 20 bits. We now use a table with $2^{20} \times 2^{20}$ entries, each table entry being 20 bits wide, which amounts to a table of size $5 \times 2^{42}$ bits. That is, the table is $5 \times 2^6 = 320$ times as large as without having multiple representatives.

Figure 2:
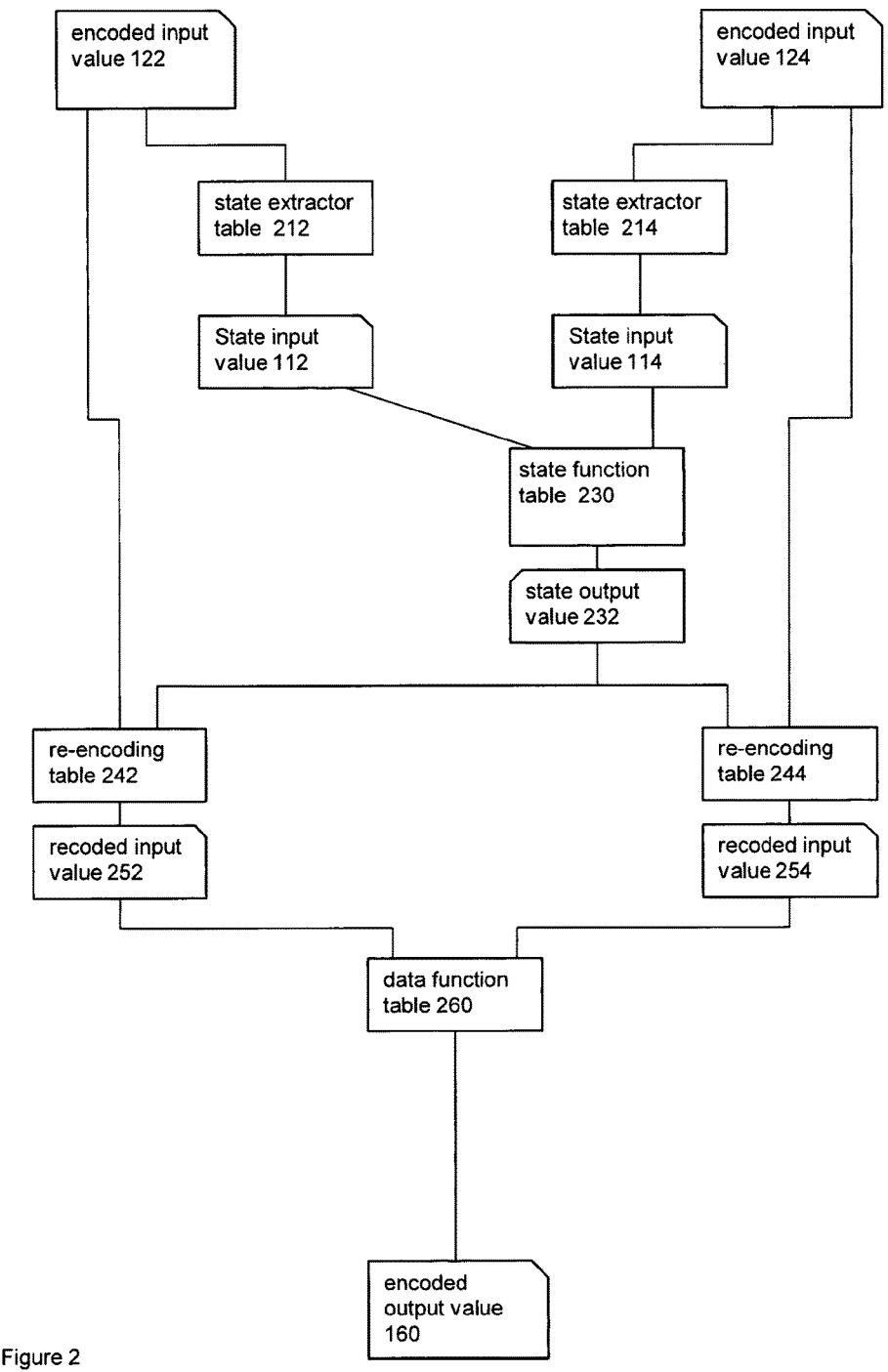
FIG. 2 is schematic chart illustrating a table network implementing a data function and a state function.

FIG. 2 shows a way to reduce the impact of combining data and state representation on the table size. Table network 200 computes the same data function and the same state function as in FIG. 1.

Table network 200 is configured for the data function and is stored in an electronic storage, coupled to an electronic processor configured to compute the data function by applying the table network.

Table network 200 comprises state extractor tables 212 and 214 configured to extract from encoded input values 122 and 124 the corresponding state values 112 and 114. Note that this does not imply that the input values are obtained in plain form at any moment. The state values are used as inputs to a state function table 230. State function table 230 represents the state function. Note that state extractor table 212, state extractor table 214 and state function table 230 could use an encoding for the state values, possibly even a different encoding for values 112 and 114; however this encoding only depends on the state value and not on the input value; the encoding may be secret, e.g., private to the particular implementation. From state function table 230 the state output value 232 is now known.

Table network 200 further comprises re-encoding tables 242, 244. These tables accept the encoded input values 122 and 124 but re-encode them to have a common state value in this particular embodiment state output 232. This means that data function table 260 may be significantly simplified since it no longer needs to be configured for the possibility that it receives two different state values. Note that the same encoded output value 160 is obtained as in FIG. 1.

Below we will give a number of embodiments using mathematical language. We consider a function f of m operands. As a first step, we may determine representations of the operands of f such that at least two operands have the same state. To show the advantages, we consider the case that the operands can attain w values and each value of the operand has s representations. The approach of FIG. 1 results in a table with $(sw)^m$ entries. If all operands of f are forced to the same state, we may use a table with only $sw^m$ entries. In an embodiment of FIG. 2 at least two operands of f's multiple operands are forced to a common state in a state space.

One way to obtain multiple representations for operands is the following. Let W denote the set of operands we wish to encode. We introduce a finite set $\Sigma$ of "states" and a finite set V with cardinality equal to the product of the cardinalities of W and $\Sigma$. The elements of $W \times \Sigma$ are mapped in a one-to-one manner to V by a secret encoding function E. The representatives of the element w in W are the members of the set $\Omega(w)=\{E(w,\sigma)|\sigma \in \Sigma\}$.

The number of representatives of each element in W thus equals the cardinality of $\Sigma$. As a result, data paths carrying symbols from V are wider than data paths for carrying symbols from W. For example, if W is the set of 16-bits integers and the state space E has $16=2^4$ elements, data paths for V use 16+4=20 bits, while data paths for W use 16 bits.

Now we consider a function f: $W \times W \to W$ that we wish to encode. We construct a function F: $V \times V \to V$ such that for all $w_1, w_2 \in W$ and $\sigma_1, \sigma_2 \in \Sigma$ we have that $$F(E(w_1,\sigma_1),E(w_2,\sigma_2)) \in \Omega(f(w_1,w_2)).$$

Or, stated in words: F maps any pair of representatives of $w_1$ and $w_2$ to a representative of $f(w_1, w_2)$. We now consider the situation that the state of a representative only depends on the states $\sigma_1$ and $\sigma_2$, which can be implemented by taking a function g: $\Sigma \times \Sigma \to \Sigma$ and by defining $$F(E(w_1,\sigma_1),E(w_2,\sigma_2))=E(f(w_1,w_2),g(\sigma_1,\sigma_2)).$$

We note that this function F has two input variables from V. A table for F thus has $|V|^2$ entries, and that each entry in an element from V. Below we show how to reduce the table size significantly. We use a table for the state-extractor $S_e$: $V \to \Sigma$ defined as $$S_e(E(w,\sigma))=\sigma$$

In FIG. 2, state extractor tables 212 and 214 represent these state-extractor functions $S_e$. Note that it is possible that a different state encoding was used in encoded input value 122 than in encoded input value 124.

We also use a table for computing the function g implemented in 230 in FIG. 2. Also, we use (secret) encodings $\tilde{E}_1$: $W \times \Sigma \rightarrow W$ and $\tilde{E}_2$: $W \times \Sigma \rightarrow W$, and tables (corresponding to tables 242 and 244 in FIG. 2) for implementing the functions $\in_1$: $V \times \Sigma \rightarrow W$ and $\in_2$: $V \times \Sigma \rightarrow W$, which are such that for i=1, 2 and all w∈W, σ, τ∈Σ, we have $\in_i(E(w,\sigma),\tau)=\tilde{E}_i(w,\tau)$.

And finally, we use a table for implementing the function φ: $W \times W \times T \rightarrow V$ such that for all $w_1 \in W$, $w_2 \in W$ and τ∈Σ, we have that $$\phi(\tilde{E}_1(w_1,\tau), \tilde{E}_2(w_2,\tau), \tau) = E(f(w_1, w_2), \tau).$$

Now consider inputs $v_1 = E(w_1, \sigma_1)$ and $v_2 = E(w_2, \sigma_2)$. Note that an attacker can observe $v_1$ and $v_2$, but cannot observe $w_1$ and $w_2$.

We run the following program.
$s_1 := S_e[v_1]$; $s_2 := S_e[v_2]$; τ:=g[$s_1, s_2$]; ( so $s_1 = \sigma_1, s_2 = \sigma_2$ )
$y_1 := \in_1[v_1, \tau]$; $y_2 := \in_2[v_2, \tau]$; ( so $y_i = \tilde{E}_i(w_i, \tau)$ )
z:=φ[$y_1, y_2, \tau$]. ( so $z = E(f(w_1, w_2), g(\sigma_1, \sigma_2))$ )

The penultimate line above corresponds to tables 242, 244, 252 and 254 of FIG. 2. The last line above corresponds to table 260 of FIG. 2.

We now determine the total size of the required tables. The table for $S_e$ has |V| entries, each of which is an element of Σ: $|V|\log_2|\Sigma|$ bits. The table for g has $|\Sigma|^2$ entries, each of which is an element of Σ: $|\Sigma|^2 \log_2|\Sigma|$ bits. The tables for $\in_1$ and $\in_2$ both have $|V||\Sigma|$ entries, each of which is an element of W: $|V||\Sigma| \log_2|W|$ bits per table. The table for φ has $|W|^2|\Sigma|$ entries, each of which is an element of V: $|W|^2|\Sigma|$ |V| bits. The total number of required bits thus equals $(|V|+|\Sigma|^2) \log_2|\Sigma|+2|V||\Sigma|\log_2|W|+|W|^2|\Sigma|\log_2|V|$.

So, if $|W|=|\Sigma|$, then we find, using that $|V|=|W||\Sigma|$, that the number of required bits equals $(4|W|^3+2|W|^2) \log_2|W|$. FIG. 1 uses $|V|^2 \log_2|V|=2|W|^4 \log_2|W|$ bits. So in this example, the table size is reduced with nearly a factor of |W|/2.

Figure 3A:
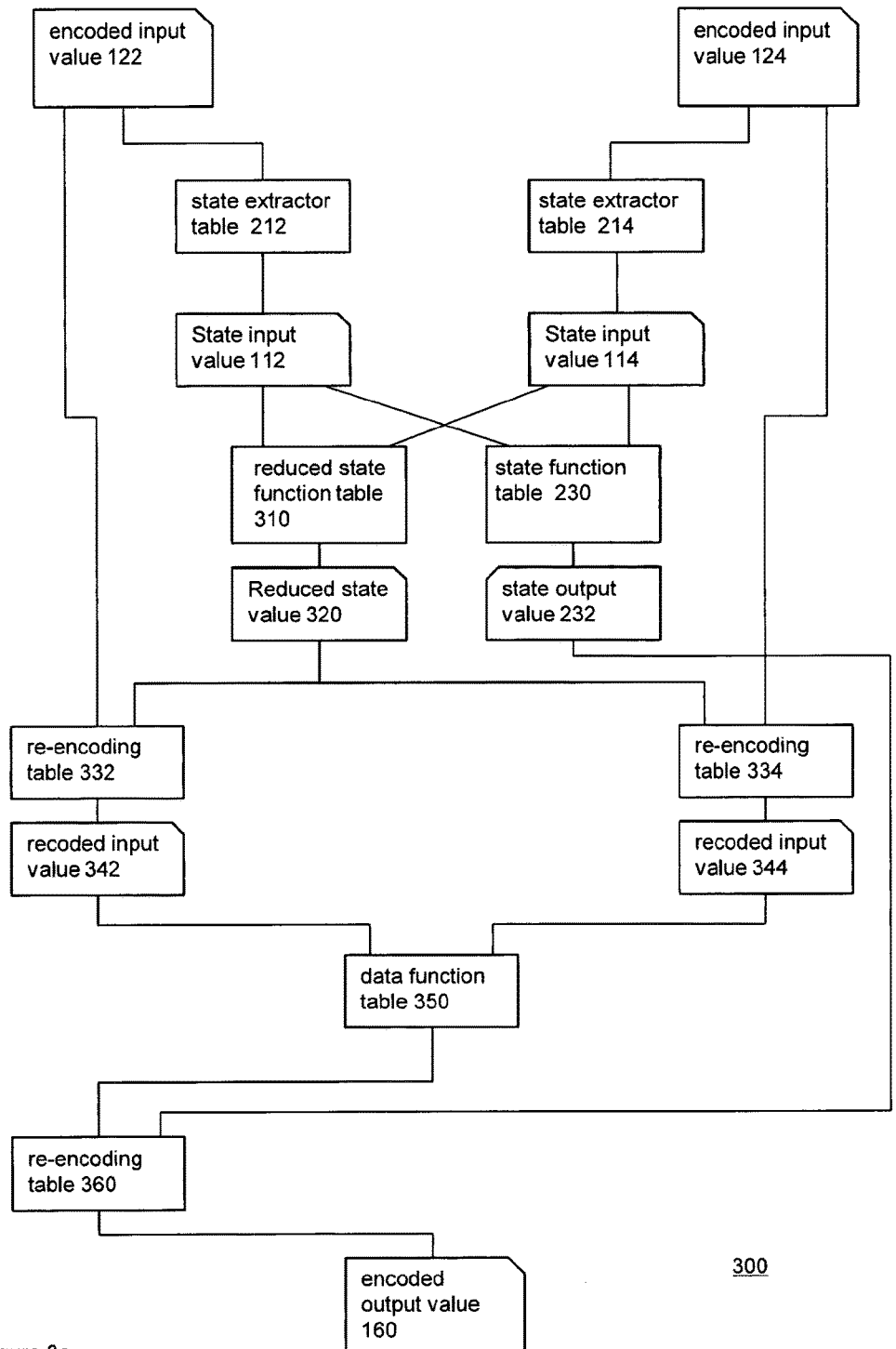
FIG. 3a is schematic chart illustrating a table network implementing a data function and a state function.

FIG. 3a shows how table size and security may be exchanged in a trade off. In addition to the state function table 230 as in FIG. 2, table network 300 comprises a reduced state function table 310. Reduced state function table 310 computes a different function on state input values 112 and 114 than state function table 230. In fact reduced state function table 310 could compute any function on the 112 and 114, e.g. a random function, except that reduced state function table 310 has a smaller range than state function table 230. That is, the number of possible output values of reduced state function table 310 is smaller than the number of possible output values of state function table 230. Reduced state function table 310 produces a reduced state value 320. For example, state output value 232 may be 4 bits and reduced state output value may be 2 bits. To simplify one may select the bits of value 320 from the bits of state output value 232; however preferably, tables 310 and 230 are distinct and not correlated, especially not in this linear fashion.

Instead of re-encoding the input values to the state output value, table network 300 re-encodes to the reduced state value 320. Table network 300 comprises re-encoding tables 332 and 334 configured to accept as input the encoded input values 122 and 124 respectively and produce new encoded values encoded for reduced state value 320 instead of state output value 164. The results are recoded input value 342, 344 respectively. So recoded input values 342 combines their function-input value in encoded input 122 with the reduced state value 320 (instead of state input value 112) encrypted together into a single value; the same holds for recoded input value 344.

Finally, data function table 350 is like data function table 260 except that it accepts a reduced range of state values. The function computed on the input value corresponds to the data function; the function on the state function could be anything, say random, or the identity. Finally, the result is re-encoded with re-encoding table 360, so that the encoded output value corresponds to state output value 164 as well as function output value 162. Re-encoding table 332 and re-encoding table 334 are also referred to as first re-encoding tables. Re-encoding table 360 is also referred to as second re-encoding table 360. Note that the recoded input 342 and recoded input 344 both contain the reduced state, this means that part of the of input of table 350 is duplicated, as a result the table may be sparse, and thus, say, compresses well if data compression is applied to it.

For example if function values and state values are each 4 bit wide and reduced state values are 2 bits wide than: re-encoding table 332/334 has 4+4+2=10 bits as input and 6 bits as output; data function table 350 has 6+6=12 bits as input. If Table 350 produces output values of the same size as the encoded input/output values, it has 4+4=8 bit outputs; if the state values are reduced, it has 6 bits outputs; if the output only has function output values (possibly encoded) it has 4 bit outputs. The exemplifying values, such as bits width 4 and 2, may be varied.

Table network 300 is configured for the data function and is stored in an electronic storage, coupled to an electronic processor configured to compute the data function by applying the table network.

Figure 3B:
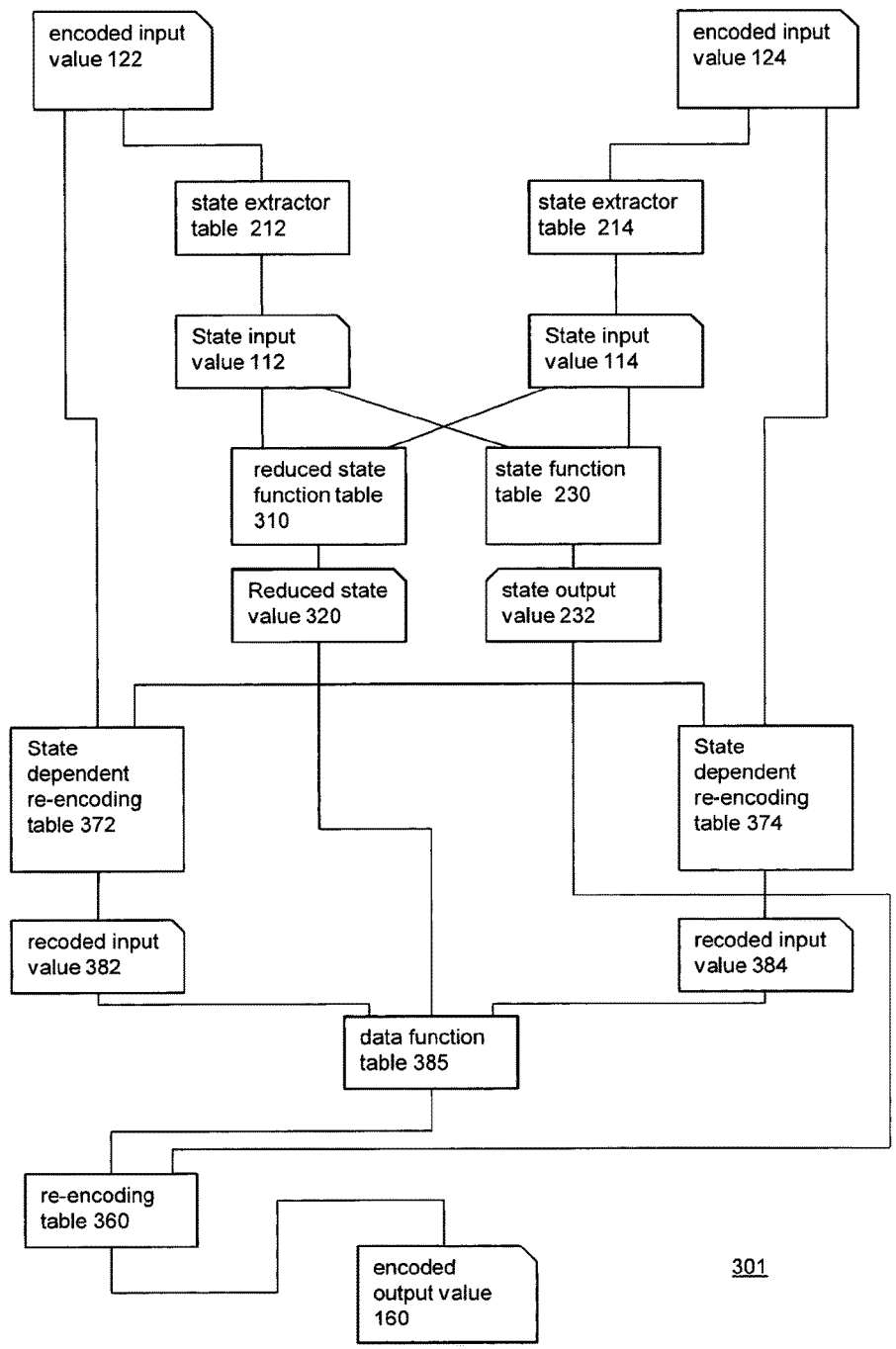
FIG. 3b is schematic chart illustrating a table network implementing a data function and a state function.

FIG. 3b shows how a different way in which table size and security may be exchanged in a trade off. Like FIG. 3a, table network 300 comprises a reduced state function table 310. However FIG. 3b does not include re-encoding tables 332 and 334. Instead, state dependent re-encoding tables 372 and 374 are used.

State dependent re-encoding tables 372 takes as input encoded input value 122, which combines a function input value and state input value but in encoded (encrypted) form. The State dependent re-encoding tables 372 extracts the function input and encodes it in a different manner, the re-encoding being dependent upon reduced state value 320. A different way to say this is, that the function input in encoded input value 122 is encrypted with the reduced state value 320 as key. State dependent re-encoding table 374 does the same thing but for encoded input value 124. The results of tables 372 and 374 are recoded input values 382 and 384.

For example if function values and state values are each 4 bit wide and reduced state values are 2 bits wide than: re-encoding table 372/374 has 4+4+2=10 bits as input and 4 bits as output; data function table 385 has 4+4+2=10 bits as input. If Table 385 produces output values of the same size as the encoded input/output values, it has 4+4=8 bit outputs; if the state values are reduced, it has 6 bits outputs; if the output only has function output values (possibly encoded) it has 4 bit outputs. The exemplifying values, such as bits width 4 and 2, may be varied.

Below we will give a number of embodiments using mathematical language. The embodiments, allows a further reduction of the size of the required tables at the potential expense of hiding the function f less well.

We use a table for state-extractor function $S_e: V \rightarrow \Sigma$ defined as $S_e(E(w,\sigma))=\sigma$; the table has |V| entries, each of which is an element of Σ, hence it uses $|V|\log_2|\Sigma|$ bits. This is table 212 and 214 in FIG. 3. Similarly, the table for implementing g has $|\Sigma|^2 \log_2|\Sigma|$ bits; This is table 230 in FIG. 3. Next, we use an "internal state space" T and a table for a mapping t: $\Sigma \times \Sigma \rightarrow T$. The table for t uses $|\Sigma|^2 \log_2|T|$ bits; This is Table 310 in FIG. 3.

Also, we use (secret) encodings $\tilde{E}_1: W \times T \rightarrow W$ and $\tilde{E}_2: W \times T \rightarrow W$. Moreover, we use tables for implementing the functions $\in_1: V \times T \rightarrow W$ and $\in_2: V \times T \rightarrow W$, which are such that for i=1, 2 and all $w \in W$, $\sigma \in \Sigma$ and $\tau \in T$, we have $\in_i(E(w,\sigma),\tau)=\tilde{E}_i(w,\tau)$. The table for each $\in_i$ has $|V||T|$ entries, each of which is an element from W, and so it uses $|V||T|\log_2|W|$ bits. These are tables 372 and 374 in FIG. 3. We use a function $\phi: W \times W \times T \rightarrow V$ such that for all $w_1 \in W$, $w_2 \in W$ and $\tau \in T$, we have $\phi(\tilde{E}_1(w_1, \tau), \tilde{E}_2(w_2, \tau),\tau)=\tilde{E}(f(w_1, w_2),\tau)$, where $\tilde{E}$ is a secret permutation of $W \times T$. The table for $\phi$ has $|W|^2|T|$ entries, each of which is an element of V, and so the number of required bits equals $|W|^2|T|\log_2|V|$. This is Table 385 in FIG. 3. Finally, we use a table for implementing a function $\Psi: W \times T \times \Sigma \rightarrow V$ such that for all $w \in W$, $\tau \in T$, $\sigma \in \Sigma$, we have $\Psi(\tilde{E}(w,\tau), \sigma)=E(w, \sigma)$. This is Table 360 in FIG. 3. The number of bits for this table equals $|W||T||\Sigma| \log_2|V|$.

The total number of required bits thus equals $(|V|+|\Sigma|^2) \log_2|\Sigma|+|\Sigma|^2 \log_2|T|+2|V||T| \log_2|W|+|W||T|(|W|+|\Sigma|) \log_2|V|$. In the special case $|W|=|\Sigma|$, this reduces to $|W|^2 \log_2|T|+2|W|^2(3|T|+1) \log_2|W|$.

From the above, it appears that a smaller internal state space T may reduce the required table size. Next, we explicitly show how to use the tables mentioned above. We consider inputs $v_1=E(w_1, \sigma_1)$ and $v_2=E(w_2, \sigma_2)$. Note that an attacker can observe $v_1$ and $v_2$, but cannot observe $w_1$ and $w_2$. We run the following program.

$s_1:=S_e[v_1]$; $s_2:=S_e[v_2]$; $\tau:=t[S_1, S_2]$; ( so $s_1=\sigma_1$, $s_2=\sigma_2$ )
$y_1:=\in_1[v_1,\tau]$; $y_2:=\in_2[v_2,\tau]$; ( so $y_i=\tilde{E}_i(w_i,\tau)$ )
$z:=\phi[y_1,y_2,\tau]$; ( so $z=\tilde{E}(f(w_1,w_2),\tau)$ )
$\sigma:=g[s_1,s_2]$; ( so $\sigma=g(\sigma_1,\sigma_2)$ )
$u:=\Psi[z,\sigma]$ ( so $u=E((f(w_1,w_2),g(\sigma_1,\sigma_2))$.)

A disadvantage of a small state space is the following. In the above program, one computes $y_1$, $y_2$ which are such that $y_i=\tilde{E}_i(w_i, \tau)$. So if an attacker observes that for two different values $v_1$ and $v_1'$ the corresponding values $y_1$ and $y_1'$ are actually equal, then he knows that $v_1$ and $v_1'$ respresent the same value of w. If T is small, then it is quite likely that different representatives for $w_1$ yield the same value for $y_1$. As an extreme case: if T has just one element, different representatives of an element in W always give the same value of $y_1$. It is thus advantageous that T is not chosen too small. For example, T may have 4 elements or 8 or 16.

Below an example is given of a construction of an encoder 110, decoder 170 and state extractor tables 212 and 214. We will assume a single function input and a single state input (there may be more of either), of each 4 bits.

| Function input | State input | Encoding |
|---|---|---|
| 0000 | 0000 | 0100 0110 |
| 0000 | 0001 | 0101 1000 |
| ... | ... | ... |
| 0000 | 1111 | 1100 1100 |
| 0001 | 0000 | 1001 0111 |
| 0001 | 0001 | 0111 1010 |
| ... | ... | ... |
| 1111 | 1111 | 0011 1001 |

The first two columns lists all possible combinations of function input values and state input values. The last column lists a random permutation of the number 0 to 255 in binary. Note that the encryption is perfect, in the sense that even with perfect knowledge of 256−2=254 input-output pairs, the remaining two pairs still have one bit of uncertainty in them. A less perfect but still very usable encoding could be obtained, by using an 8 bit wide block cipher.

An encoding table is obtained by sorting on the first two columns, the resulting table shows how to obtain the last column (encoding) from the first two. By sorting on the last column, a table is obtained that decodes instead of encodes. By removing the first column and sorting on the last column a state extractor function is obtained. Note that generally, it is not needed to store both the input and output column. For example, if the input column is sorted and contains all possible combinations, it may be omitted.

Figure 3C:
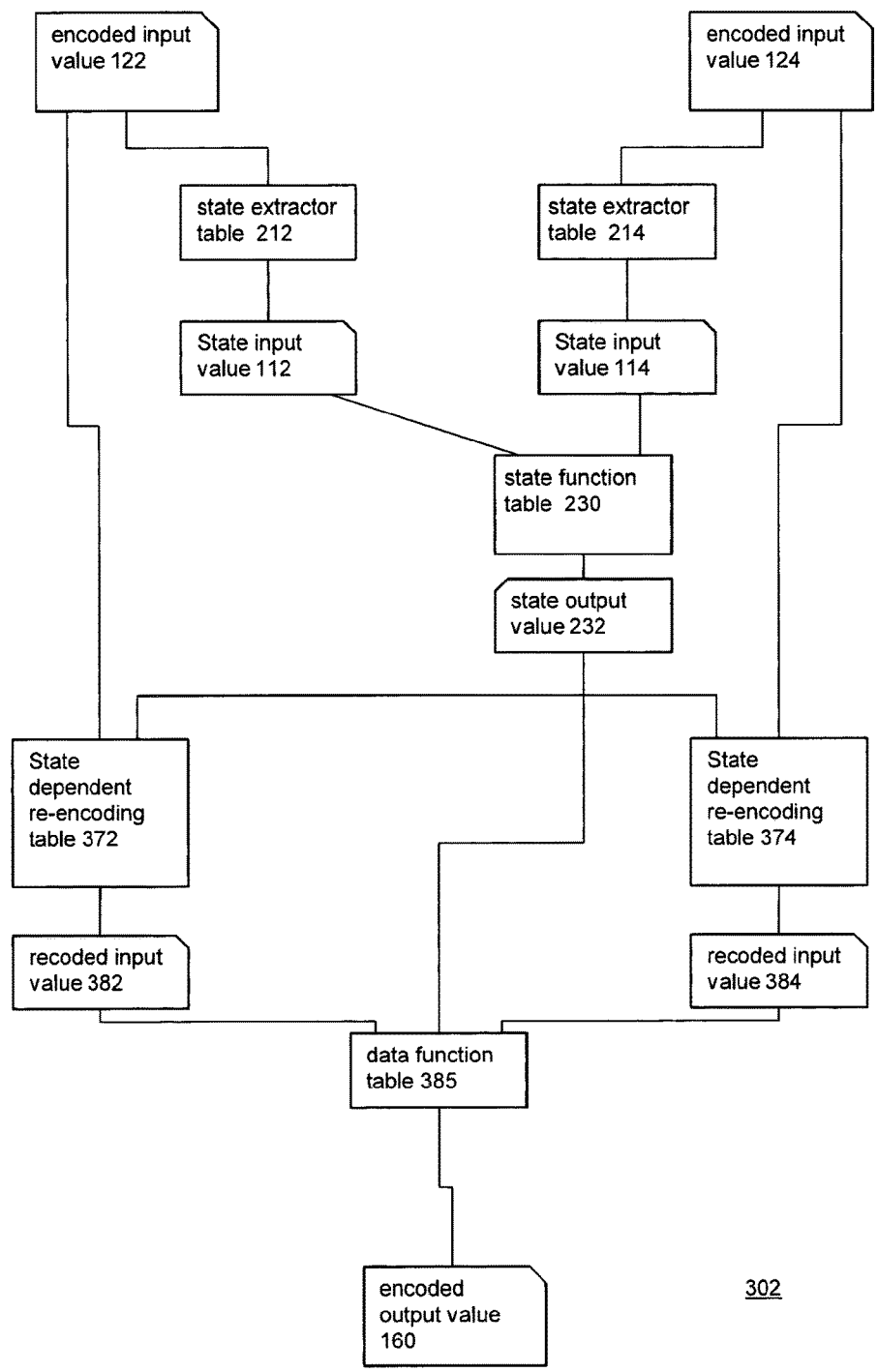
FIG. 3c is schematic chart illustrating a table network implementing a data function and a state function.

FIG. 3c shows state dependent re-encoding without using a reduced state function. The state dependent re-encoding tables 372 and 374 of FIG. 3c are the same as those of FIG. 3b except that they have as input the state output value 232 instead of the reduced state value. This means that the re-encoding which takes places is more secure. On the other hand the tables in 372, 374 and 385 have a wide input. Interestingly, although data function table 385 of FIG. 3c has a larger input, than that of FIG. 3b, no re-encoding table 360 is needed since table 385 now has the correct state output value to incorporate in the output (although this is possible, which would reduce table size).

Taking again 4 bits for function and state values as an example, the table 372 of FIG. 3c has 4+4+4=12 bits as input and 4 bits as output. Table 385 of FIG. 3c has 4+4+4=12 bits as input and 4+4=8 bits as output.

Figure 5:
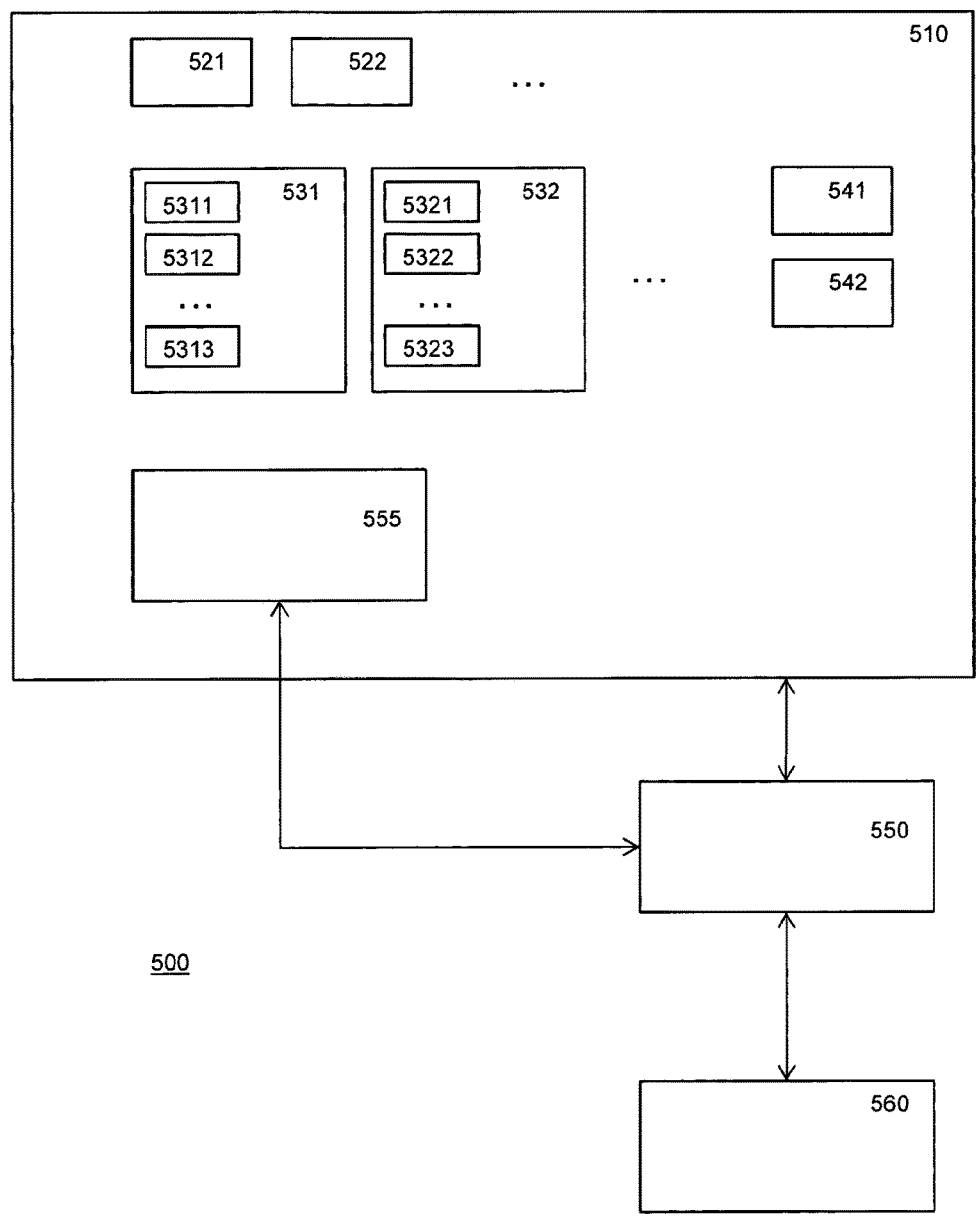
FIG. 5 is a block diagram illustrating a computing device.

FIG. 5 shows a computing device 500, having a storage device 510. Storage device 510 is typically one or more non-volatile memories, but may also be a hard disc, optical disc, etc. Storage device 510 may also be a volatile memory comprising downloaded or otherwise received data. Computing device 500 comprises a processor 550. The processor typically executes code 555 stored in a memory. For convenience the code may be stored in storage device y 510. The code causes the processor to execute a computation. Device 500 may comprise an optional I/O device 560 to receive input values and/or transmit results. I/O device 560 may be a network connection, removable storage device, etc.

Storage device 510 contains one or more table networks according to one of the FIGS. 1 to 3.

In an embodiment, the computing device may work as follows during operation: computing device 500 receives input values. The input values are encoded, e.g. by using the encoding table 541, e.g. table 110. Thus the input values are obtained as encoded input values. Note that the input values could be obtained as encoded input values directly, e.g. through device 560. Encoding an input value to an encoded input value implies that a state input has to be chosen. There are several ways to do so, for example the state input may be chosen randomly, e.g., by a random number generator. The state input may be chosen according to an algorithm; the algorithm may be complicated and add to the obfuscation. The state input value may also be constant, or taken sequentially from a sequence of numbers, say the sequence of integers having a constant increment, say of 1, and starting at some starting point; the starting point may be zero, a random number, etc. Choosing the state inputs as a random number and increasing with 1 for each next state input choice is a particular advantageous choice. If the state inputs are chosen off-device the attacker has no way to track where state input values are chosen and what they are.

Processor 550 executes a program 555 in memory 510. The program causes the processor to apply look-up tables to the encoded input values, or to resulting output values.

Look-up tables may be created for any logic or arithmetic function thus any computation may be performed by using a sequence of look-up tables. This helps to obfuscate the program. In this case the look-up tables are encoded for obfuscation and so are the intermediate values. In this case the obfuscation is particularly advantageous because a single function input value may be represented by multiple encoded input values. Furthermore, some or all table and/or table networks have the multiple function property.

At some point a result value is found. If needed the result may be decoded, e.g. using the decoding table 542, e.g. table 170. But the result may also be exported in encoded form. Input values may also be obtained from input devices, and output values may be used to show on a screen.

The computation is performed on encoded data words. The computation is done by applying a sequence of table look-up accesses. The input values used may be input values received from outside the computing device, but may also be obtained by previous look-up table access. In this way intermediate results are obtained which may then be used for new look-up table accesses. At some point one of the intermediate results is the encoded result of the function.

Computing device 500 may comprise a random number generator for assigning state input values to data function inputs.

Figure 6:
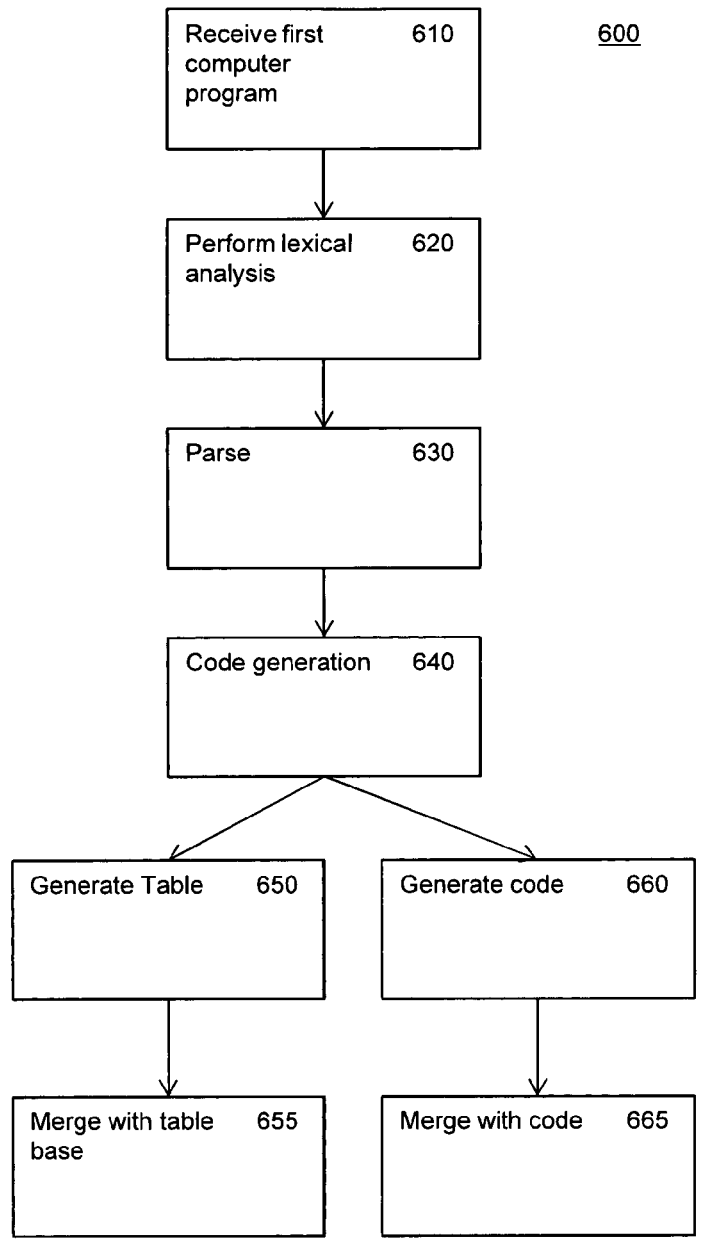
FIG. 6 is a flowchart illustrating a compiler.

FIG. 6 illustrates as flow chart a compiling method 600. In step 610 a first computer program is received by a receiver. In step 620 a lexical analysis is performed, e.g., to identify tokens, by a lexical analyzer. Possibly processing such as macro expansion is also done. In step 630 the program is parsed by a parser. For example, the parser generates a parsing tree according to a formal grammar of the programming language of the first program. The parser identifies the different language constructs in the program and calls appropriate code generation routines. In particular, an operator or multiple operators are identified. In that case, in step 640 code generation is done by a code generator. During code generation some code is generated and if needed accompanying tables. The accompanying tables include tables that are configured for two functions: one for the needed operator and a state function. The generated code does not need, and generally will not, contain the operator as it is replaced by one or more look-up tables. The state function may be chosen at random. The state function may also be chosen as a result of the program, for example, the state function may be another needed operator, which will allow the table to be re-used. For example, the parser will identify and add operation and translate this into a look-up table for the add instruction and in generated code for applying the look-up table to the correct values. As the state function the compiler may select a random function. The compiler may also select at random a function from a set of functions, say addition, subtraction, multiplication and the like.

In step 655 the generated tables are merged to a table base, since it may well happen that some tables are generated multiple times, in that case it is not needed to store them multiple times. E.g. an add-table may be needed and generated only once. When all code is merged and all tables are merged the compilation is finished. Optionally, there may be an optimization step.

Typically, the compiler uses encoded domains, i.e., sections of the program in which all value, or at least all values corresponding to some criteria, are encoded, i.e., have code word bit size (n). In the encoded domain, operations may be executed by look-up table execution. When the encoded domain is entered all values are encoded, when the encoded domain is left, the values are decoded. A criterion may be that the value is correlated, or depends on, security sensitive information, e.g., a cryptographic key.

An interesting way to create the compiler is the following. In step 630 an intermediate compilation is done. This may be to an intermediate language, e.g. register transfer language or the like, but may also be a machine language code compilation. This means that for steps 610-630 of FIG. 6 a conventional compiler may be used, which is does not produce table networks. However in step 640 code generation is done based on the intermediate compilation. For example, if machine language code was used, each instruction is replaced by a corresponding operator free implementation of that instruction, i.e., a table-based implementation of that instruction. This represents a particular straightforward way to create the compiler. FIG. 6 may also be used to generate a compiler that produces not machine language but a second programming language.

In an embodiment, the compiler is a compiler for compiling a first computer program written in a first computer programming language into a second computer program, the compiler comprises a code generator to generate the second computer program by generating tables and machine language code, the generated tables and the generated machine language code together forming the second computer program, the generated machine language code referencing the tables, wherein the compiler is configured to identify an arithmetic or logical expression in the first computer program, the expression depending on at least one variable, and the code generator is configured to generate one or more tables representing pre-computed results of the identified expression for multiple values of the variable and representing at least one other expression, and to generate machine language code to implement the identified expression in the second computer program by accessing the generated one or more tables representing pre-computed results. Ideally, the machine language code generated to implement the identified expression does not contain arithmetic or logic machine instructions itself, at least no arithmetic or logic machine instructions related to sensitive information. An attacker who reverse engineered the tables may find that it may represent the identified expression, but that it may also represent the other expression.

This increases resistance against reverse engineering and lowers, side-channel leakage of the second computer program because it contains fewer arithmetic or logic operations. Ideally all arithmetic and logical expressions and sub-expressions in are replaced by table accesses. Since those instructions which constitute the arithmetic or logical expression or sub expressions are absent they cannot leak any information. The table is pre-computed; the power consumed to perform the arithmetic or logical behavior enclosed in the table is not visible during execution of the program.

Figure 7:
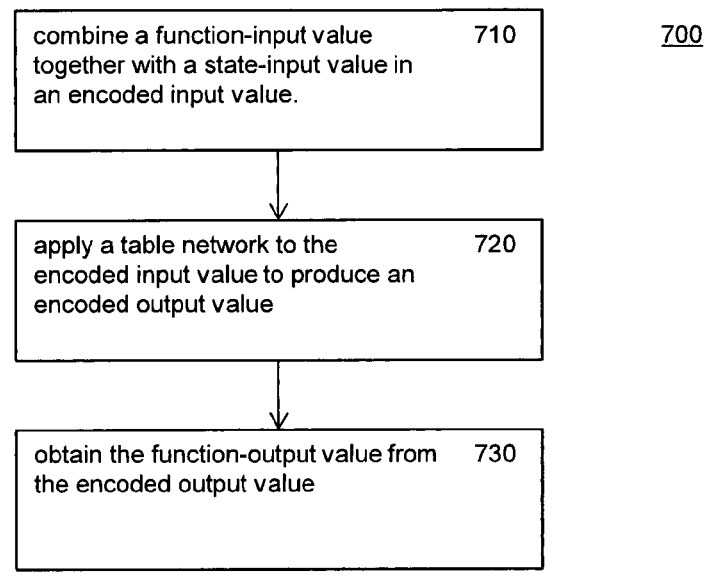
FIG. 7 is a flowchart illustrating a method for computing a data function.

FIG. 7 illustrates in a flowchart a method 700 for computing a data function on a function-input value. In step 710 a function-input value is combined together with a state-input value in an encoded input value. This combination is done in an encrypting manner. Note that the encoding of input values may be done at a different location and/or by a different party. In step 720 a table network is applied to the encoded input value to produce as output an encoded output value. In step 730, the function-output value is obtained from the encoded output value. Note that the state-output value could also be obtained from the encoded output value but this may not be needed. The function-output value equals the result of applying the data function to the function-input value, and the state-output value equals the result of applying a state function to the state-input value. Step 730 may be done at a different location and/or by a different party.

Many different ways of executing the methods disclosed herein are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method.

A method according to the invention may be executed using software, which comprises instructions for causing a processor system to perform method 700. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMERALS IN FIGS. 1-5

100 a table network
102, 104 a function input value
110 an encoder
112, 114 a state input value
122, 124 an encoded input value
130 a data function
160 an encoded output value
162 a function output value
164 a state output value
170 a decoder
180 a table network
200 a table network
212, 214 a state extractor table
230 a state function table
242, 244 a re-encoding table
252, 254 recoded input value
260 a data function table
310 a reduced state function table
320 a reduced state value
332, 334 a re-encoding table
342, 344 recoded input value
350 data function table
360 re-encoding table
372, 374 state dependent re-encoding table
382, 384 recoded input value
410 an input table
420 an intermediate table
430 an output table
500 a computing device
510 a storage device
521, 522 single input look-up tables
531, 532 multiple input look-up tables
5311-5323 single input look-up tables
541 encoding look-up table
542 decoding look-up table
555 machine language code
550 a computer processor
560 I/O device

The invention claimed is:

1. A computing device configured to run a computer program compiled by a compiler stored on a non-transitory computer readable medium, the compiler being configured for parsing the computer program to identify multiple operators, including a data function (f) and a state function (g), and for producing a table network configured for the data function and the state function, said computer program compiled by the compiler being configured to execute the operators by look-up table execution of the table network, wherein the table network is configured to take, as input, an encoded input value, combining a function input value encrypted together with a state input value, and produce, as output, an encoded output value, the encoded output value combining a function-output value encrypted together with a state-output value, wherein the function-output value equals the result of applying the data function to the function-input value, and the state-output value equals the result of applying the state function to the state-input value, wherein the computing device comprises:

an electronic storage storing the table network produced by the compiler, configured for a data function (f) and a state function (g); and an electronic processor coupled to the storage and configured to compute the data function and the state function by applying the table network, wherein the computing device is configured to obtain the function-input value as an encoded input value, the encoded input value combines the function-input value encrypted together with a state-input value, wherein the table network is configured to take, as input, the encoded input value and produce, as output, an encoded output value, the encoded output value combining a function-output value encrypted together with a state-output value, wherein the function-output value equals the result of applying the data function (f) to the function-input value and the state-output value equals the result of applying a state function (g) to the state-input value, and wherein the table network comprises:
a state extractor table configured such that state extractor table applied to the encoded input value produces the state-input value;
a state function table configured such that the state function table applied to the state-input value produces the state-output value; and
a re-encoding table configured for receiving, as input, the encoded input value and the state-output value and producing, as output, a recoded input value, the recoded input value combining the function-input value together with the state-output value encrypted together into a single value.

2. The computing device as claimed in claim 1, wherein the computing device is configured to use the state or data function of the table network on the function-input value depending on a current encoding of the encoded input value.

3. The computing device as claimed in claim 2, wherein the encoded input value combines the function-input value and the state-input value encrypted together into a first single value according to a first encoding (E), wherein
the table network is configured to obtain the function-input value and the state-input value as a further encoded input value, the further encoded input value combining the function-input value together with the state-input value encrypted together into a second single value according to a second encoding ($\tilde{E}$), and wherein
the table network is configured to take, as input, the further encoded input value and produce, as output, a further encoded output value, the further encoded output value combining a function-output value together with a state-output value encrypted together into a further single value, wherein the function-output value equals the result of applying the state function (g) to the function-input value and the state-output value equals the result of applying the data function (f) to the state-input value.

4. The computing device as claimed in claim 3, wherein the first encoding is defined by a first encoding function E(x,y), wherein x denotes a function-input and y denotes a state-input, and the second encoding is defined by a second encoding function defined by $\tilde{E}(x,y)=E(y,x)$.

5. The computing device as claimed in claim 3, wherein the computing device is configured to pre-process and post-process inputs and output of the table network with the function composition ($\tilde{E}E^{-1}$) of the second encoding ($\tilde{E}$) and the inverse of the first encoding (E).

6. The computing device as claimed in claim 1, wherein the table network comprises a single table taking, as input, the encoded input value and producing, as output, the encoded output value.

7. The computing device as claimed in claim 1, wherein the table network comprises a data function table configured for receiving, as input, the recoded input value and producing, as output, the encoded output value.

8. The computing device as claimed in claim 1, wherein the table network comprises:
a reduced state function table configured for receiving the state-input value and producing, as output, an intermediate state value equal to the result of a reduced state function applied to state-input value, the range of the reduced state function being larger than a single value and smaller than the range of the state function, the encoded input value being recoded in dependence upon the intermediate state value.

9. The computing device as claimed in claim 8, wherein the table network comprises:
a first re-encoding table configured for receiving, as input, the encoded input value and the intermediate state value, and producing, as output, a recoded input value, the recoded input value combining the function-input value together with the intermediate state value encrypted together into a first single value;
a data function table configured for receiving, as input, the recoded input value, and for producing, as output, a recoded output value, the recoded output value combining the function-output value together with the intermediate state value encrypted together into a second single value; and
a second re-encoding table configured for receiving, as input, the recoded output value and the state-output value, and producing, as output, the encoded output value.

10. The computing device as claimed in claim 8, wherein the table network comprises:
a first re-encoding table configured for receiving, as input, the encoded input value and the intermediate state value, and producing, as output, a recoded input value, the recoded input value being the function-input re-encoded, the re-encoding being selected in dependence upon the intermediate state value;
a data function table configured for receiving, as input, the recoded input value and reduced state value, and producing, as output, the function-output value in an encoded form; and
a second re-encoding table configured for receiving, as input, the function-output value in an encoded form and the state-output value, and producing, as output, the encoded output value.

11. The computing device as claimed in claim 1, wherein the table network comprises:
a first re-encoding table configured for receiving, as input, the encoded input value and the state-output value, and producing, as output, a recoded input value, the recoded input value being the function-input re-encoded, the re-encoding being selected in dependence upon the state-output value.

12. The computing device as claimed in claim 1, wherein the table network is configured for function-input values having at least 4 bits.

13. The computing device as claimed in claim 1, wherein the table network is configured for state-input value values having at least 4 bits.

14. The computing device as claimed in claim 1, wherein the function-input value and the state-input value have the same bit size.

15. The computing device as claimed in claim 1, wherein W denotes a set of operands, $\Sigma$ denotes a set of states, V denotes a set with a cardinality equal to the product of the cardinalities of W and $\Sigma$, E denotes a secret encoding function mapping the elements of W×$\Sigma$ in a one-to-one manner to V, f denotes a function f: W×W→W, g denotes a function g: $\Sigma$×$\Sigma$→$\Sigma$, the table network being configured to compute a function F: V×V→V such that for all $w_1, w_2 \in W$ and $\sigma_1, \sigma_2 \in \Sigma$, such that $F(E(w_1,\sigma_1), E(w_2,\sigma_2))=E(f(w_1,w_2), g(\sigma_1,\sigma_2))$.

16. The computing device as claimed in claim 1, wherein the data function and the state function take multiple input values, the number of input values of the data and state function being the same, the computing device being configured to obtain the multiple function-input values as multiple encoded input values, wherein each one of multiple encoded input values combines a function-input value of the multiple input values encrypted together with a state-input value of the multiple state input values, the table network being configured to take, as input, the multiple encoded input values, and to produce, as output, an encoded output value, the function-output value being the result of applying the data function to the multiple function-input values, and the state-output value being the result of applying the state function to the multiple state-input values.

\* \* \* \* \*